United States Patent

[11] 3,603,558

[72] Inventor Maxwell L. Cripe
   South Bend, Ind.
[21] Appl. No. 1,657
[22] Filed Jan. 9, 1970
[45] Patented Sept. 7, 1971
[73] Assignee The Bendix Corporation
   Division of Ser. No. 773,074, Nov. 4, 1968,
   Pat. No. 3,517,970.

[54] BRAKE PROPORTIONING MEANS
   5 Claims, 1 Drawing Fig.
[52] U.S. Cl. .................................................. 251/61.5,
   303/40
[51] Int. Cl. .................................................. F16k 31/145

[50] Field of Search.......................................... 251/61.2,
   61.5

[56] References Cited
   UNITED STATES PATENTS
   2,592,885  4/1952  Fox et al. ..................... 137/111 X
   3,461,913  8/1969  Scott ........................... 251/61.5 X
Primary Examiner—Arnold Rosenthal
Attorneys—William N. Antonis and Plante, Arens, Hartz,
   Smith & Thompson ABSTRACT: A proportioning means for a dual hydraulic brake system that will regulate the brake pressure in one portion of that system in two steps by utilizing a device responsive to a control pressure for proportioning the brake pressure in steps.

PATENTED SEP 7 1971
3,603,558
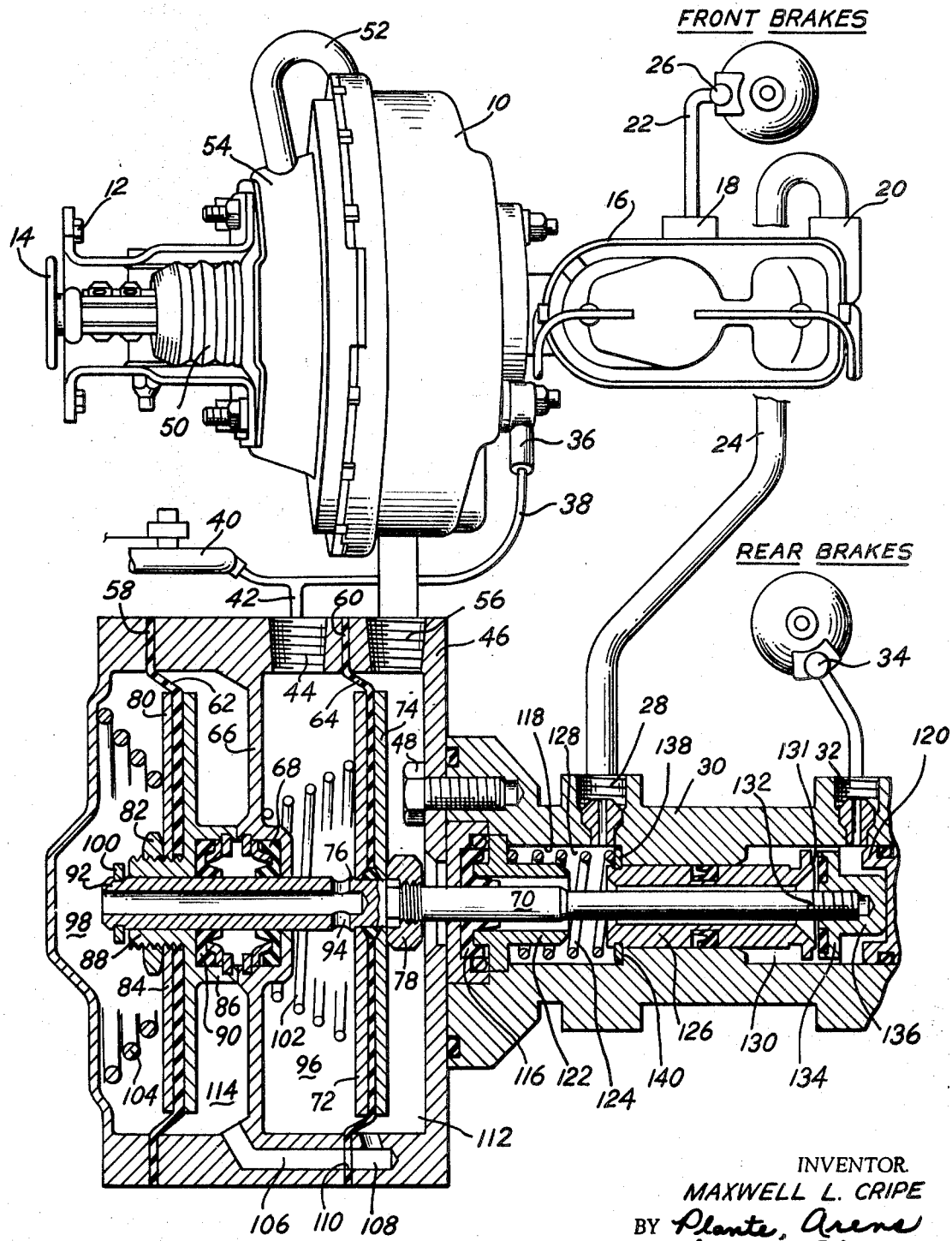
INVENTOR.
MAXWELL L. CRIPE
BY Plante, Arens
Hartz, Smith & Thompson
ATTORNEY

BRAKE PROPORTIONING MEANS

This is a division of application Ser. No. 773,074, filed Nov. 4, 1968 now U.S. Pat. No. 3,517,970.

SUMMARY

As may be realized by those skilled in the art to which this invention relates vehicle brake design for many years now has attempted a reasonable compromise between rear brake effort and front brake effort in accordance with the design of the wheel cylinders for the rear wheel brakes and the front wheel brakes. Of late there have been attempts to utilize similar wheel cylinders in both the front and rear brakes by providing a brake-proportioning means adapted to reduce brake pressure in the rear wheel brakes based upon a predetermined inlet pressure corresponding to front wheel brake pressure that takes effect upon the weight shift during a deceleration to automatically proportion the hydraulic brake pressure as a function of front hydraulic brake pressure.

Most of the prior art designs to proportion braking pressure have simply utilized input pressure from the master cylinder as the reference source for regulating the output pressure to the rear wheel brakes, generally speaking. However, there have been some attempts recently to more idealize the pressure relationship of front and rear wheel brakes by incorporating elements to render the brake proportioning device more responsive to the shift in weight. These devices have involved simple but yet additional structure linking the brake proportioning device between the vehicle and the rear axle in order to utilize the increased distance due to a weight shift therebetween as the load shift input to the valving mechanism. The attempt here was to more readily maintain the relationship of the rear brake pressure to input pressure, or front wheel pressure, within the span of the curves for such relationship on that vehicle when it is empty and when it is loaded. There can be no doubt that a better balanced vehicle brake system is provided by such load-sensitive devices. On the other hand, it is equally true that these prior art devices still provided a straight line curve stepped at a point to maintain it under the ideal curvilinear function of the rear brake pressure to front brake pressure desired.

It is, therefore, a principal object of this invention to provide a brake pressure proportioning device which will utilize a control pressure for providing a multi stepped relationship of rear brake pressures to front brake pressures that will more readily approach the ideal curvilinear relationship without crossing thereover in all ranges of the vehicle loading.

It is another object of this invention to provide a brake proportioning device in a brake system utilizing a servomotor operated master cylinder by tapping the control pressure for the servomotor and providing it to a slave servomotor and hydraulic cylinder, which hydraulic cylinder is interposed in the brake system between a portion of the split master cylinder and the rear wheel brake actuator, such that the control pressure will regulate a piston valve in the proportioning mechanism by means of walls whose rate of movement is controlled by spring means of different values of force.

DRAWING DESCRIPTION

Other objects and advantages will appear from the following description of the drawing in which there is shown a vehicle brake system employing a servomotor operated master cylinder with a brake-proportioning device in accordance with the principles of this invention shown in cross section to be interposed between a portion of the split master cylinder and a brake actuator, more particularly, the rear wheel brake-actuating means.

DETAILED DESCRIPTION

With more particular reference to the FIGURE, there is shown a vacuum over air servomotor 10, such as is familiar to those skilled in the art that is affixed by bolts 12 to a firewall to be operated by a brake pedal 14 within the operator's compartment of the vehicle. The servomotor 10 has bolted thereto a master cylinder 16 with separate discharge ports 18 and 20 to which conduits 22 and 24 are joined.

Conduit 22 leads to a caliper-type disc brake motor 26 for the front wheel brakes of the vehicle; whereas conduit 24 leads to an inlet 28 of a slave cylinder 30 that has an outlet port 32 connected to a caliper disc brake motor 34 of the rear wheel brakes.

The vacuum over air servomotor receives vacuum via a check valve 36 connected by conduits 38 to the vehicle's engine intake manifold 40, which conduit 38 is provided with a branch 42 connected to an inlet port 44 for a slave motor housing 46 to which slave cylinder 30 is affixed by bolts 48.

As has been indicated, the servomotor 10 is of a conventional type, and it will be, therefore, readily recognized that it has a control chamber and a reference pressure chamber with the latter in open communication via the check valve 36 to the vacuum of the engine intake manifold 40. Normally the control chamber and the reference pressure chamber are communicated by an internal passage arrangement and valve means within a movable wall of the servomotor 10 that is closed upon depressing brake pedal 14 whereby atmospheric air entering at the end of the boot 50 is introduced to the servomotor control chamber. With this invention in mind, a conduit 52 is affixed to the rear shell 54 of servomotor 10 so as to be opened to the control chamber thereof and thereby providing means of conduction of the controlled chamber pressure to an inlet port 56 of the slave servomotor housing 46.

As can be readily visualized the slave servomotor housing 46 is comprised of a plurality of sections which are joined together by bolt means (not shown) and the juncture of the various sections are sealed by peripheral portions 58 and 60 of diaphragms 62 and 64. The intermediate section is provided with a partition 66 of annular design and provision to mount the seal 68 in the central opening thereof. Diaphragm 64 is assemblable to a force transmitting rod 70 by means of plates 72 and 74 held against a shoulder 76 of rod 70 by a nut 78. Diaphragm 62, on the other hand, is supported by means of a plate 80 being held by a nut 82 to an annular plate 84 having forwardly and rearwardly extending bosses 86 and 88, the former of which mounts a seal means 90 and the latter of which is externally threaded for receipt of nut 82 and provided with a bore slidably receiving tubular end 92 of rod 70. The tubular end 92 of the rod 70 is provided with transverse openings 94 so that chamber 96 opens to port 44 can be communicated to chamber 98 via the tubular end 92. A snap ring 100 is affixed to the tubular end 92 to provide an abutment surface for the boss 88 of the plate 84 supporting diaphragm 62 that connects the diaphragm 62 and its plates which form a movable wall assembly to the push rod 70 when the aforesaid movable wall assembly moves to the left as viewed in the FIGURE. Upon assembly a light spring 102 is inserted to be between partition 66 and plate 72 of the movable wall assembly formed by diaphragm 64 and plate 72, 74; whereas a heavy spring 104 is placed between the end of the housing and the movable wall assembly comprised of diaphragm 62 and plates 80, 84. The intermediate and forward sections of housing 46 are provided with aligned passages 106 and 108 that upon assembly communicate, via an opening 110 in the peripheral portion of diaphragm 64, chamber 112 open to port 56 to chamber 114.

Within the slave cylinder 30 connected to housing 46 by bolts 48 prior to the assembly of the movable wall means therein, a seal structure 116 closes the leftward end of a stepped bore 118 for housing 30 and a plug 120 is held by a snap ring (not shown) closes the other end of the stepped bore. A combination seal retainer and spring bearing means 122 locates the seal 116 and supports a spring 124 at one end, whose other end is bearing on an annular piston 126 between inlet chamber 128 and outlet chamber 130 of the slave cylinder 30. Rod 70 extends through the annular piston 126 and terminates in a threaded portion 132, to which is assembled so as to face a valve seat 131 for piston 126 a poppet valve 134, having a forwardly projecting boss 136 cooperating with plug 120 to form a stop prescribing the rest position of the movable wall assemblies within housing 46 and the spacing between valve 134 and valve seat 131 of piston 126 in view of stop ring 138 being normally abutting shoulder 140 of stepped bore 118 under the action of spring 124.

OPERATION

In operation the vehicle operator will depress brake pedal 14 to introduce atmospheric control pressure into control chamber for servomotor 10 to create a differential pressure across the movable wall thereof and thereby develop hydraulic pressure in conduits 22 and 24. At first the hydraulic pressure is communicated to both the motors 26 and 34 in that spring 102 is strong enough to maintain the position of rod 70 as shown in the FIGURE. However, as control pressure builds within the servo motor 10, it also builds within chambers 112 and 114 to eventually overcome spring 102 and close poppet 134 on seat 131 to terminate the communication of hydraulic pressure from conduit 24 to the disc brake motor 34. If the vehicle operator is still scheduling further braking effort and increasing the hydraulic pressure by applying more control pressure in the servomotor 10, the movable wall assembly comprised of diaphragm 64 and plate 74 will move to a position to reduce the rate of increase of hydraulic pressure for the rear brake system. Eventually control pressure will reach a magnitude which will start the compression of the spring 104 to provide additional force on the rod 70 for further stepping down the rear brake pressure. However, it should be realized that the movable wall assembly comprised of diaphragm 62 and plates 82, 84 will not be effective until at the point of runout of the movable wall assembly comprised of diaphragm 64 and plates 72, 74.

Upon release of the brakes the reintroduction of vacuum into the control chamber for the servomotor 10 will reintroduce vacuum to chambers 112 and 114 permitting springs 104 and 102 to return the diaphragms 62 and 64 to their rest position, as shown in the FIGURE. Spring 102 will also urge the movement of the poppet valve 134 to separate from the valve seat 131 which is assisted in that the inlet pressure via conduit 24 has been released so that the pressure within the brake system from the actuator 34 back to the slave cylinder will cause piston 126 to maintain the spacing of the poppet 134 from seat 131. This provides a proportioning system with a low hysteresis during release which is a desirable attribute.

Having fully described an operative manner of construction for this invention, it is now desired to set forth the intended protection sought by these Letters Patent in the appended claims.

1. A control for a servomotor operated hydraulic system to proportion pressure in a portion of the system in accordance with control pressure for the servomotor, said control comprising:
    a fluid pressure motor having movable wall means therein subjected to spring means characterized by at least a first movable wall operatively connected to a second movable wall and movable relative thereto with a first spring for said first movable wall and a second spring for said second movable wall of greater force than said first spring, said motor having means to introduce the control pressure to one side of the movable wall means, said movable wall means having a force transmitting rod attached thereto; and
    a hydraulic cylinder having port means to interpose said cylinder between an actuator and a device to be actuated in one portion of the hydraulic system, said cylinder having means to receive and support said force transmitting rod therein with said rod being operatively connected to valve means for passages through a piston communicating said port means interiorly of said cylinder such that the communication is responsive to the position of said movable wall means and the pressure differential across said valve means.

2. The structure of claim 1 wherein said cylinder is divided into an inlet chamber and a displacement chamber by said piston that are communicated by a central bore through said piston which said rod passes to provide said passages therebetween with said piston terminating in a valve seat face in said displacement chamber for a poppet valve attached to said rod therein.

3. The structure of claim 2 wherein said poppet valve is provided with a boss forming a stop means with an end wall of said cylinder for the rest position of said movable wall means.

4. The structure of claim 2 wherein said first movable wall has a tubular boss slidably supporting said second movable wall and communicating reference pressure to chambers containing said spring means on opposite sides of the movable wall means than the one side on which the control pressure is introduced.

5. The structure of claim 4 wherein the control pressure for said first movable wall is routed by passages in a housing for the motor to the second movable wall.